(12) United States Patent
Boussoukaia et al.

(10) Patent No.: US 8,407,359 B2
(45) Date of Patent: Mar. 26, 2013

(54) CAMPAIGN FOR DOWNLOADING DATA INTO PORTABLE COMMUNICATING OBJECTS

(75) Inventors: Nadir Boussoukaia, Marseilles (FR); Frédéric Martinent, Marseilles (FR); Laurent Loubaud, Meyreuil (FR); Guillaume Pascal, La Ciotat (FR)

(73) Assignee: Gemalto SA, Meudon (FR)

( * ) Notice: Subject to any disclaimer, the term of this patent is extended or adjusted under 35 U.S.C. 154(b) by 712 days.

(21) Appl. No.: 11/663,880

(22) PCT Filed: Jul. 28, 2005

(86) PCT No.: PCT/EP2005/053703
§ 371 (c)(1),
(2), (4) Date: Mar. 18, 2008

(87) PCT Pub. No.: WO2006/034904
PCT Pub. Date: Apr. 6, 2006

(65) Prior Publication Data
US 2009/0037586 A1 Feb. 5, 2009

(30) Foreign Application Priority Data
Sep. 27, 2004 (FR) ...................................... 04 10225

(51) Int. Cl.
*G06F 15/16* (2006.01)
(52) U.S. Cl. ........................................ 709/231; 709/227
(58) Field of Classification Search .......... 709/208–211, 709/227–229; 340/825
See application file for complete search history.

(56) References Cited

U.S. PATENT DOCUMENTS

| | | | |
|---|---|---|---|
| 6,400,996 B1 * | 6/2002 | Hoffberg et al. ................ | 700/83 |
| 2002/0083428 A1 | 6/2002 | Lee | |
| 2003/0041125 A1 | 2/2003 | Salomon | |
| 2003/0065738 A1 | 4/2003 | Yang et al. | |
| 2003/0084108 A1 * | 5/2003 | Syed ............................. | 709/206 |

(Continued)

FOREIGN PATENT DOCUMENTS

| | | |
|---|---|---|
| EP | 1 049 006 A2 | 11/2000 |
| WO | WO 02/44892 A2 | 6/2002 |

OTHER PUBLICATIONS

Jorg Nonnenmacher and Ernst W. Biersack, Asynchronous Multicast Push: AMP, Proceedings of ICCC, Sep. 9, 1997.*

(Continued)

*Primary Examiner* — Mohamed Ibrahim
(74) *Attorney, Agent, or Firm* — Buchanan Ingersoll & Rooney PC

(57) ABSTRACT

The downloading of data from a server into one (Cn) of the portable communicating objects (C1 CN), such as chip cards or mobile terminals, over a radiocommunications network involves: a preprocessing of data (PRET) in the server into at least one data message intended for the communicating object; a sending (E) of the data message from the server to the communicating object; a reception (R) by the server of an acknowledgement of reception by the communicating object, and; a post-processing of data (POST) in the server contingent on the acknowledgement of reception. The pre-processings of data (P1) and post-processings of data (P3) concerning the communicating objects are respectively executed before and after sending the data message and receiving the acknowledgements of reception (P2) concerning the communicating objects. The server communicates with the radiocommunications network only during the sending and receiving of messages.

10 Claims, 3 Drawing Sheets

U.S. PATENT DOCUMENTS

2003/0084434 A1    5/2003   Ren
2004/0098715 A1    5/2004   Aghera et al.
2005/0033829 A1*   2/2005   Oommen ..................... 709/220
2005/0083929 A1*   4/2005   Salo et al. ..................... 370/389

OTHER PUBLICATIONS

International Search Report.

* cited by examiner

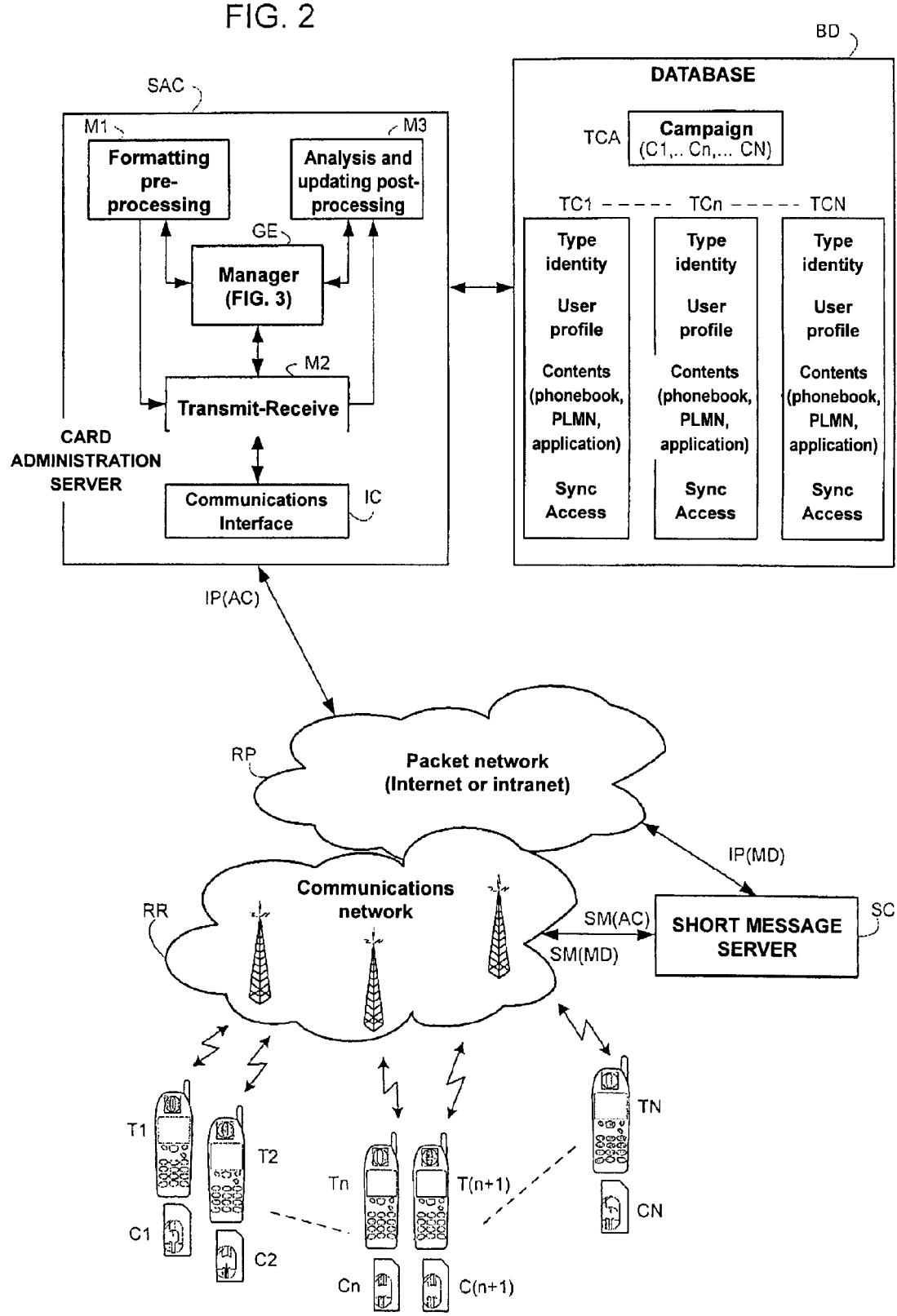

CAMPAIGN FOR DOWNLOADING DATA INTO PORTABLE COMMUNICATING OBJECTS

The present invention relates to downloading data from a server into portable communicating objects through a radiocommunications network. In particular, the communicating objects are smart cards, such as Subscriber Identity Module (SIM) cards, inserted into mobile terminals of the radiocommunications network.

The data download server or "Over The Air (OTA) card administration platform" has software that enables the operator managing the radiocommunications network to keep control over the smart cards in the mobile terminals and to modify the contents of said cards. Such operations which are performed at the initiative of the operator (push mode) concern, for example, downloading a file into predetermined cards of the fleet managed by the operator, or downloading or deleting a determined application, or indeed modifying data in a file or a determined application in cards managed by the operator.

The data to be downloaded into the smart cards is often transmitted through a short message server. A plurality of short messages are often necessary in order to download an application or a file.

The invention relates more particularly to a campaign for downloading data for the purpose of massively updating user cards, even though the OTA data download server can effect individual downloading into a single user card.

In a first example, such individual downloading relates to a unique personal file that is intended for roaming users who travel abroad frequently and that contains more than about ten identifiers of preferred networks managed by operators with whom the operator of the network managing the cards has entered into contracts. The preferred network identifier file is unique and is to be downloaded into numerous predetermined cards so that the users of those cards can use it when they travel abroad.

For this first example, the operator currently has two possibilities for downloading the file from the OTA server. In a first possibility, the operator decides to download the file individually, as and when such a file becomes necessary, i.e. the first time an interested user goes roaming, and so on, one after another, for all of the users who go roaming. In a "campaign mode" second possibility, the server sends the preferred network identifier file in a single campaign to the cards whose users have taken out a subscription to a roaming option.

In campaign mode, the number of users targeted can be as high as several hundreds of thousands or millions.

In a second example, individual downloading relates to a unique file of names and telephone numbers of sales representatives of a firm to be downloaded into the cards of the users employed in the firm.

In a third example, individual downloading relates to an application facilitating management of the phonebooks of telephone numbers in the SIM cards. The application enables a user to back up his or her entire phonebook in a predetermined server managed by the operator every time the user records a new telephone number in his or her card;

In the third example, three possibilities are offered. After seeing a television commercial, the user calls the call center of the operator during the day in order to ask for the application to be downloaded into his or her SIM card. This operation is an individual operation triggered in the OTA server by the operator in customer care mode. In a second possibility, the user takes the initiative of ordering downloads (pull mode) by consulting the operator's site himself or herself from his or her mobile terminal so as to trigger downloading of the application into the SIM card. This downloading is also an individual operation controlled in the OTA server by the user in the Self Care mode. In a third possibility, the operator triggers an operation for downloading in campaign mode to more than one million targeted users so that the OTA server administrates the downloading of the application into the one million SIM cards.

It appears that campaign mode has technical complexity that is considerably greater than the technical complexity of individual mode since campaign mode consists in repeating the individual operations for a very large number of cards, while complying with constraints concerning short message rate and campaign length, and also concerning monitoring the progress of the campaign.

Since the download campaign is very long, an operator always seeks to reduce the time for which a card is locked during the campaign in order not to prevent access for too long to the card for individual operations triggered, in particular, by the user of the card. Therefore, the number of campaigns and their lengths are fundamental elements that are imposed on operation of the OTA download server.

In accompanying FIG. 1, elements of data processing phases for downloading predetermined data into N user smart cards C1 to CN in mobile terminals from the OTA download server are indicated in the form of blocks, each of which comprises three elements of processing. Each block concerns downloading, via a short message, into a respective smart card Cn, where n is such that $1 \leq n \leq N$. A first element of processing PRE relates to pre-processing data to be formatted into a data message to be transmitted to the smart card Cn. The second element of processing T/R extends from transmission by the server of the formatted data message to reception by the server of the acknowledgment transmitted by the smart card Cn. The third element of processing is post-processing POST during which the server analyzes the received acknowledgement and stores any data contained in the acknowledgement so as to record said data in a database in correspondence with a number of the smart card Cn.

At the beginning of the campaign, the server successively transmits prepared messages of formatted data to the first cards C1, C2, C3, . . . targeted by the campaign, and immediately analyzes the acknowledgement of each of the messages of data transmitted in this way. Since an acknowledgement implicitly indicates that the mobile terminal of the user is in a state to receive and to process a previously transmitted data message, the server transmits another prepared message of formatted data after the post-processing POST of an acknowledgement that has just been transmitted by the user card. A succession of two sets, each comprising three elements of processing, is indicated relative to the cards C1 and C3 in FIG. 1.

The campaign ends when all of the expected acknowledgements of the transmitted data messages have been processed. However, certain acknowledgements will never be transmitted by user cards when mobile terminals including them are not connected to the radiocommunications network during the campaign, or, in particular, when the short message server and/or when the radiocommunications network has/have lost one or more messages of formatted data whose destination is a smart card. The last block in FIG. 1 is associated with a last card Cd which can be any card targeted by the campaign, and, a priori, different from the card CN.

As a result of the process of the elements of processing during the campaign, the length of the campaign depends on the number of messages of formatted data and thus on the number of short messages to be transmitted and on the number of smart cards targeted during the campaign. The length of time of the campaign offered through the short message server thus depends on the length of time of the three elements of processing PRE, T/R, and POST and on how the blocks of three elements of processing shown in FIG. 1 follow on from one another for downloading into each card.

The download suffer from the drawback of requiring a long campaign length because they depend on a plurality of successive sets of three elements of processing for each targeted card. Under such conditions, the short message server is busy for a very long time and lacks availability for transmitting and receiving short messages interchanged between the users and short messages for other campaigns.

In addition, the download server has to manage a plurality of types of processing at the same time, which slows its execution speed down and therefore increases the length of the campaign. For a predetermined rate of short messages offered by the short message server to the download server, and with the servers having equal execution performance, the download server cannot achieve that rate because of the correlation of the intermediate transmit/receive T/R processing with the pre-processing PRE and the post-processing POST for each data message during the campaign.

An object of the invention is to remedy the above-mentioned drawbacks of the organization of the elements of processing in the download server during a campaign in order to load a larger number of cards for a given campaign length and in order to use the download server more efficiently for the various elements of processing.

In order to achieve that object, a method for downloading data from a server into portable communicating objects through a radiocommunications network, the downloading of data relating to a communicating object comprising data pre-processing in the server means for pre-processing data into at least one data message whose destination is the communicating object, transmission of the data message from the server means to the communicating object, and reception by the server means of an acknowledgment transmitted by the communicating object, and data post-processing in the server depending on the acknowledgement, is characterized in that the data pre-processing phases and the data post-processing phases relating to the communicating objects are executed respectively before and after the transmissions of data messages and the reception of acknowledgements relating to the communicating objects, and the server means communicates with the radiocommunications network only during the transmissions of message data and during the receptions of acknowledgements.

In other words, the server means do not communicate with the radiocommunications network during the data pre-processing and data post-processing relating to the communicating objects.

In practice, the data messages and the acknowledgements can be respectively transmitted and received by the server means through a communications gateway, such as, for example, a short message server, during at least one predetermined time range and with a maximum rate dependent on operation of the communications gateway.

In accordance with the invention, all of the data pre-processing elements are executed during a pre-processing phase without the server means communicating with the radiocommunications network. By grouping together the pre-processing elements, the server means make optimum use of their resources because they are constrained to execute the same type of processing element. The same applies to the data post-processing elements that are executed together during a post-processing phase during which the server means are not communicating with the radiocommunications network.

During the post-processing, the database included in the server means and used for recording, in particular, updated images of the contents of the communicating objects, such as smart cards, has its resources managed much better than when the server means have to execute pre-processing and post-processing at the same time as data transmissions/receptions.

Advantageously, this technological break with the prior art enables the resources of the server means to devote themselves entirely to transmitting and receiving data while the server means are communicating with the radiocommunications network, e.g. through a communications gateway such as a short message server. The ranges of hours imposed by operation of the communications gateway are occupied solely by communications in the server means, i.e. by transmitting formatted data messages and by receiving acknowledgements. For a given time range, the number of data messages transmitted using the method for downloading of the invention is much higher, and the speed of operation of the server means is thus better adapted to the rate offered by the short message server during each time range. Conversely, for a given number of data messages, the necessary resources of the server means are reduced by the method for downloading of the invention. Therefore, for the same length of campaign, and for the same amount of resources in the server means, the invention downloads to a higher number of cards than prior art methods do. The operator of the radiocommunications network also reduces the time spent monitoring the progress of the campaign.

Preparing data in advance during the pre-processing phase offers the possibility of optimizing the data pre-processing. According to an advantageous characteristic of the invention, the data pre-processing relating to communicating objects that have at least one common characteristic has a common portion executed once only before the transmissions of data messages and the receptions of acknowledgements. This characteristic optimizes the use of the resources of the server means and therefore optimizes the length of time taken by the data pre-processing.

With the same concern to optimize the resources of the server means, the length of time of the post-processing phase can be reduced by seeking common characteristics of the communicating objects. In which case, the data post-processing relating to communicating objects that have at least one common characteristic has a common portion executed once only after the transmissions of data messages and the receptions of acknowledgements.

Thus the decorrelation of the three elements of processing in accordance with the invention and therefore the gathering together of the three types of processing elements into three distinct phases, and the factorization of certain operations by batches of cards during the pre-processing and post-processing phases optimize the speed of processing of the server means and facilitate an increase in the rate of the data to be transmitted during a campaign of predetermined length. Conversely, for a given campaign length, the amount of resources required of the server means of the invention is smaller than the amount of resources necessary for the prior art.

The present invention also provides a download server for downloading data into portable communicating objects of mobile terminals through a radiocommunications network. According to the invention, the download server includes a pre-processing module for pre-processing data into data messages whose destinations are respective ones of the communicating objects while the server is not communicating with the radiocommunications network, a transmit-receive module for transmitting the data messages to communicating objects and for receiving acknowledgements transmitted by the communicating objects through the radiocommunications network in response to the data messages, and a post-processing module for post-processing data in the server depending on the received acknowledgements while the server is not communicating with the radiocommunications network.

The invention also provides a computer program on an information medium, said computer program including program instructions adapted to implementing a method for the invention for downloading data from server means into portable communicating objects through the radiocommunications network when said program is loaded and executed in the server means. According to the invention, the program includes pre-processing instructions for pre-processing data into data messages whose destinations are respective ones of the communicating objects while the server means are not communicating with the radiocommunications network, transmit-receive instructions for transmitting the data messages to the communicating objects and for receiving acknowledgements transmitted by the communicating objects through the radiocommunications network in response to the data messages, and post-processing instructions for post-processing data in the server means depending on the received acknowledgements while the server means are not communicating with the radiocommunications network.

Other characteristics and advantages of the present invention appear more clearly on reading the following description of various preferred embodiments of the invention, given by way of non-limiting example and with reference to the corresponding accompanying drawings, in which:

FIG. 2 is a block diagram of telecommunications means connecting mobile terminals including smart cards of an operator to a card administration server managed by the operator, for implementing the method for the invention for downloading data;

Figure 1:
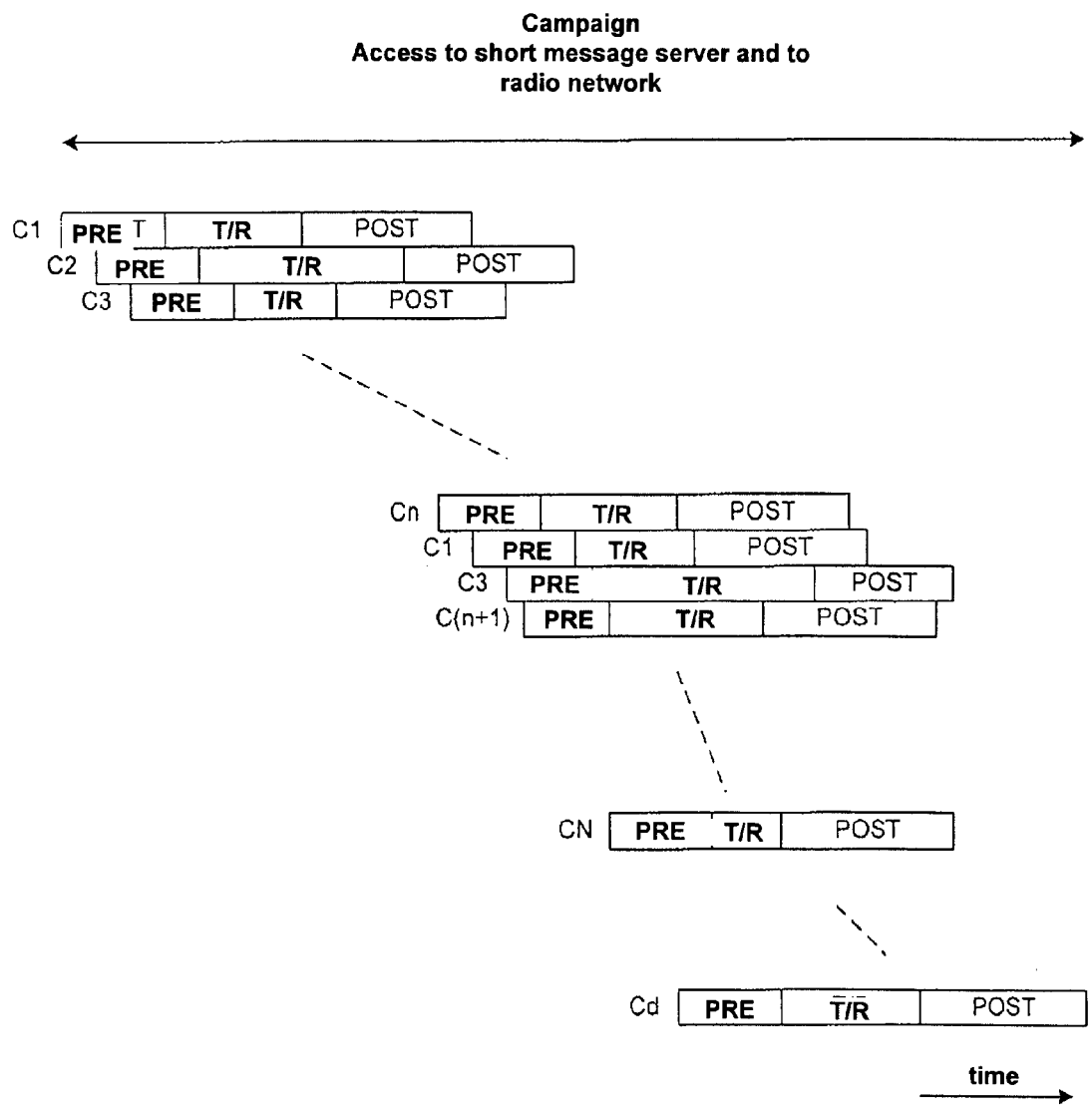
FIG. 1 is a timing diagram of elementary steps of a prior art method for downloading data into smart cards, and is referred to above.

FIG. 2 shows main means for downloading data into removable user smart cards C1 to CN that equip respective ones of the mobile radio terminals T1 to TN attached to a digital cellular radiocommunications network RR. The smart card Cn in the mobile terminal Tn with n such that 1≦n≦N, is of the Universal Integrated Circuit Card (UICC) type. For example, the smart card is a SIM card when the network RR is of the Global System for Mobile Communications (GSM) type, or a Universal Subscriber Identity Module (USIM) when the network RR is a Code Division Multiple Access (CDMA) network of the Third Generation Partnership Project (3GPP) type, of the Universal Mobile Telecommunications System (UMTS) type.

A card administration server SAC of the invention is managed by the operator of the network RR and constitutes an OTA platform. In the implementation shown in FIG. 2 to which reference is made below, the server SAC transmits messages of formatted data MD to the mobile terminals T1 to TN and receives messages of acknowledgement AC transmitted by the mobile terminals T1 to TN, via a communications gateway such as a short message server or "Short Message Service Center" (SMSC) SC. The server SC has an access gateway for communicating with the server SAC via a high-speed packet network RP, such as the Internet, or such as an intranet specific to the operator of the network RR. Another access gateway of the short message server SC communicates with at least one switching center or exchange of the mobile service, often through an access network such as a packet network of the X.25 type or an Integrated Services Digital Network (ISDN) or an Asynchronous Transfer Mode (ATM) network. The data messages MD are transported in Internet Protocol (IP) packets by the server SAC, and they are formatted in the server SC into short messages SM transmitted to the mobile terminals; conversely, acknowledgement messages AC are transmitted in short messages SM by a mobile terminal Tn, the destination of which messages is the server SAC, and said acknowledgement messages are routed by the server SC in the form of IP packets to the server SAC.

In a variant, the short message server SC is connected directly to or is incorporated in a switching center or exchange of the mobile service in the network RR.

The invention is not limited to short messages SM as vectors for carrying the data to be transmitted. The server SC can be a Multimedia Messaging Service (MMS) message server for multimedia files and applications to be downloaded from the server SAC.

In another implementation, the short message server is replaced with an access network of the packet switching network type with mobility being managed and with access being by radio and that is a General Packet Radio Service (GPRS) network, if the radiocommunications network RR is of the GSM type. A Serving GPRS Support Node (SGSN) of the GPRS network is connected to at least one base station controller of the network RR. A Gateway GPRS Support Node (GGSN) of the GPRS network is connected to the packet network RP serving the server SAC.

In a variant, if the radiocommunications network RR is of the UMTS type, or of the GSM type back-to-back with a GPRS network, the messages MD and AC are interchanged between a mobile terminal Tn and the associated card Cn using the Bearer Independent Protocol (BIP) or the Java 2 Mobile Edition (J2ME) protocol.

As shown in FIG. 2, the card administration server SAC is connected to a database BD including various parameters and characteristics of the cards managed by the operator of the radiocommunications network RR.

Each smart card Cn is associated with a table TCn in the database BD. The table TCn contains, in particular, initial characteristics which are related to the identity of the card Cn and to the type of the card and which are recorded in the database BD as soon as the card is brought into service. These initial characteristics are, in particular, a serial number of the card, the International Mobile Subscriber Identity (IMSI) of the user of the card, and the telephone number of the Mobile Station ISDN (MSISDN) Number. The type of the card Cn is defined in particular by an identifier of the type of the processor included in the card, the identifier of the manufacturer of the card, the number of bits per word processed by the processor, the characteristics of the operating system and of the virtual machine that are implemented in the card, etc.

Other characteristics specific to use of the card and in particular of the user terminal Tn can also be recorded in the table TCn associated with the card Cn when the card is brought into service, and they can be modified during use of the card. Such other characteristics concern, in particular, the subscription profile of the user of the card Cn, data that can be modified by the user or by the operator managing the card such as a phone and address book of telephone numbers and of email addresses, and, for example, a file of identifiers of Preferred Public Land Mobile Networks (PPLMNs). The networks identified in the PPLMN file are managed by operators with whom the operator of the network RR to which the card Cn is attached has entered into agreements so that the user of the card Cn communicates through said networks when the user is traveling through areas covered by said networks.

The table TCn also contains one or more identifiers of applications that are downloaded when the smart card Cn is brought into service or that are downloaded subsequently to the bringing into service of said card. For example, one application consists in modifying the file of PPLMN identifiers. In another example, the application consists in deleting an application from the card Cn or in downloading an application into said card, e.g. for the purpose of facilitating management of the phonebook of telephone numbers in the card Cn by making it possible for the user, every time said user records a new telephone number in the card, to back up his or her entire phonebook in a specific server managed by the operator so that the user can retrieve his or her backed-up phonebook when he or she loses the card Cn or changes cards. Another application can serve to modify parameters in an application that has already been downloaded into the card Cn; e.g. the parameters to be modified are an update of prices of credit re-load and of call units when the user is a subscriber to a pre-paid account.

The table TCn also contains parameters specific to administration of the card Cn. These administration parameters are, in particular, an indicator of access of the card Cn that gives information about operation of the card Cn during one of three data download method phases P1, P2, and P3 that are defined below, and a synchronization word or "synchronization counter" transmitted in a formatted data message MD by the server SAC, and whose destination is the card Cn.

The database BD also contains one or more campaign tables TCA that are assigned to respective ones of campaigns. Each campaign table includes a list of the MSISDN telephone numbers and of the addresses of the tables associated with the cards targeted by the campaign, which cards are assumed below to be the N cards C1 to CN, and the hours during which the campaign is to be conducted.

The data base BD can be incorporated into the card administration server SAC, or it can be independent in the form of a database management server that is connected to the server SAC via a packet network such as the network RP, i.e. via the Internet or via an intranet network specific to the operator of the network RR.

As shown in detail in FIG. 2, the card administration server SAC has three software modules MA, M2, and M3 for executing respective ones of the three main phases P1, P2, and P3 of the invention for downloading of the data, under the control of a manager module GE that manages the various operations during the downloading, as in the timing diagram shown in FIG. 3 and described below.

The invention thus relates not only to a method for downloading data that is implemented in server means such as the administration server SAC and the database BD, but also to an implementation of steps of the method for downloading data into portable communicating objects such as smart cards or mobile terminals, the steps being determined by the instructions of a data download program incorporated in the server means SAC-BD. The method for the invention is then implemented when the program is loaded into a computer, such as the server means SAC-BD, whose operation is then controlled by execution of the program. The invention thus applies to a computer program that is recorded on or in any medium (e.g., a suitable non-transitory computer readable medium) or means or circuit for storing information, based on any programming language, e.g. a high-level language such as Java, and compiled in executable codes that are adapted to implementing the method for the invention in the computer such as the server means SAC-BD.

It is assumed that a predetermined time range and a predetermined rate for short messages SM are made available in the short message server SC for the campaign that is to be launched by the operator of the radiocommunications network RR managing the short message server SC. The predetermined time range is, for example, a daytime range from 9 a.m. to 7 p.m. five days a week, in order to receive the larger number of acknowledgement messages from the users who are available during said time range, compared with a nighttime time range. In a variant, the time range is 24 hours a day for a predetermined period.

Figure 3:
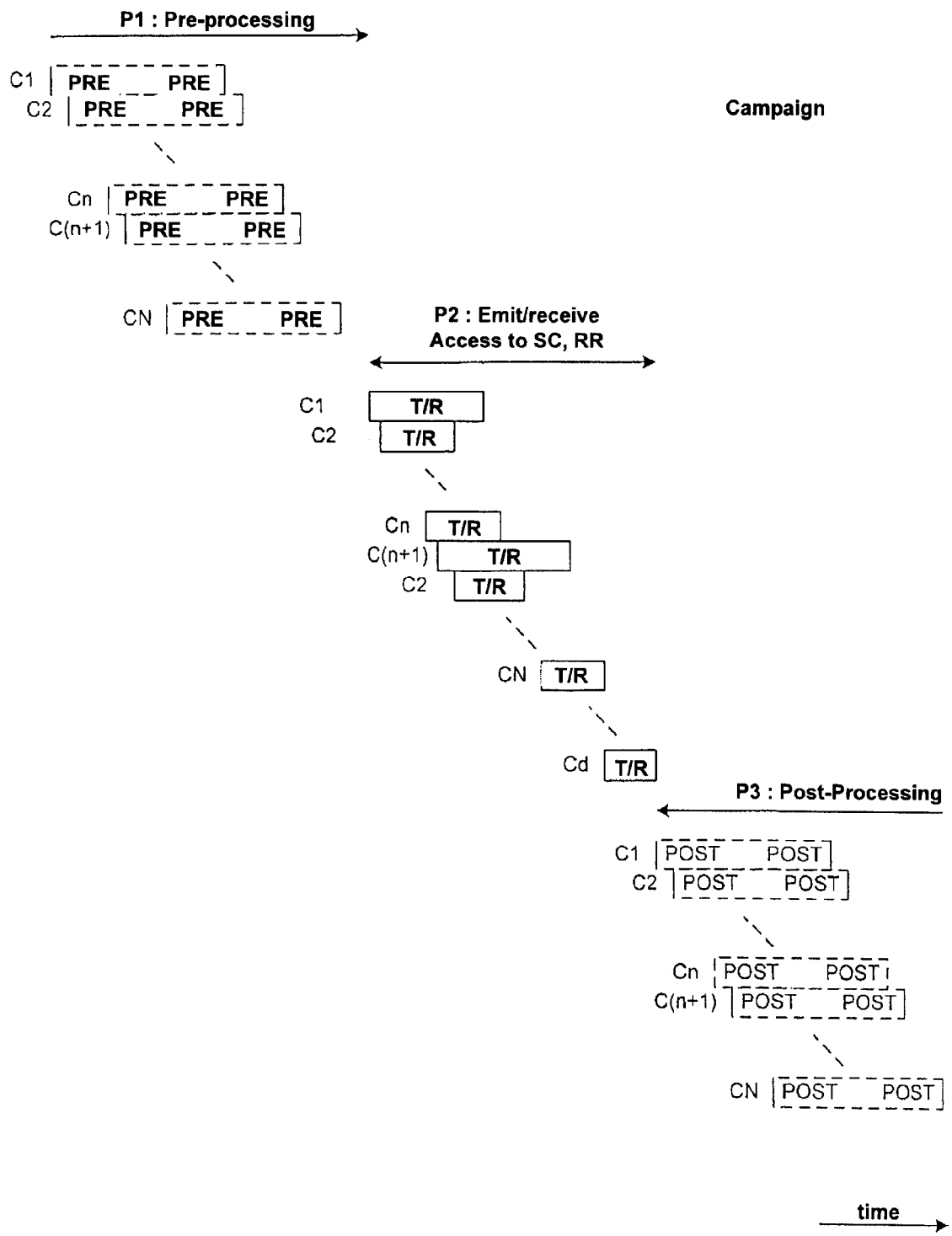
FIG. 3 is a timing diagram of the main steps of a method for the invention for downloading data.

As shown in FIG. 3, the campaign is subdivided into three phases P1, P2, and P3, only the "transmit/receive" intermediate phase P2 taking place during the predetermined time range so as to use that time range for message transmission and reception only.

Therefore, in the invention, the data pre-processing phase P1 and the data post-processing phase P3 are performed respectively before and after the transmissions of data messages MD and the receptions acknowledgement messages AC for all of the smart cards C1 to CN to which messages are to be transmitted during the predetermined time range. The card administration server SAC thus does not communicate with the short message server SC during the phases P1 and P3 and thus does not have access to the radiocommunications network RR during those phases.

By way of example, the number N of smart cards to be reached during a campaign can be in the range several hundreds of thousands to a few million. The number of short messages to be transmitted to a card can be as high as a few tens, which corresponds to several million or to several tens of millions of short messages to be transmitted during the campaign. The predetermined rate of short messages SM can vary in the range about ten short messages per second to about more than one thousand short messages per second, a short message comprising at the most 140 eight-bit bytes.

The manager GE initializes the campaign by starting with the pre-processing phase P1 and activates the pre-processing module M1. The pre-processing consists essentially in formatting the data to be transmitted into data messages MD.

Figure 4:
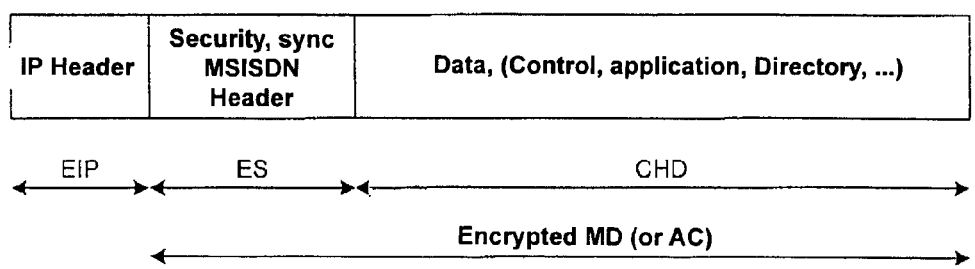
FIG. 4 shows main fields of a message transmitted or received in a second implementation of the invention.

As shown in FIG. 4, a data message MD whose destination is the smart card Cn is made up of two portions: namely a header ES that is specific to the card Cn and a field CHD of data that can be at least partially common to a plurality of smart cards targeted by the campaign.

The header ES typically comprises a few eight-bit bytes and, in particular contains security parameters specific to the card Cn, such as signatures, e.g. authentication signatures, and/or encryption elements, the suffix of the MSISDN telephone number corresponding to the card Cn, and a synchronization word. All of these items of data are read from the table TCn associated with the card Cn in the database BD so as to include them in the header ES of the data message.

After the header ES has been generated, data items to be downloaded into the card Cn, which data items are of variable length, are often fragmented into data fields CHD. Each data field CHD has a variable length indicated in the header ES. The data fields contain data specific to the campaign, such as data for updating a phonebook or an address book, or a list of preferred radiocommunications network identifiers, or such as instructions of an application to be downloaded.

The generated header ES and each data field CHD are concatenated into a data message MD to be transmitted, which data message is optionally encrypted as a function of a key that is personal to the card Cn. The data message MD is packeted into an IP message whose header EIP contains the address of the server SAC as source, the address of the server SC as destination, the length of the IP packet, etc. The module M1 formats the data firstly for the first card C1, then successively for the cards C2 to CN. The packets IP(MD) constructed in this way are stored in a buffer memory of the First In First Out (FIFO) type of the server SAC pending transmission of them during the next phase P2.

Certain types of data pre-processing PRE relating to cards having at least one common characteristic preferably have a common portion executed once only during the phase P1 preceding message transmission during phase P2. Thus, during phase P1, the manager module GE sorts the cards C1 to CN targeted by the campaign as a function of common characteristics that it can read from the tables TC1 to TCN. Such common characteristics can depend, in particular on the type of the card, and thus on the identifier of the manufacturer of the card, and on the type of user and thus, in particular, on the user profile.

For example, when the module M1 is to establish a command to be transmitted in the data fields CHD of messages MD, the command is established once only for all of the cards coming from the same manufacturer and having the same processor. Such pre-processing is validated or invalidated for all of the cards in question. Compared with prior art techniques, grouping identical pre-processing or identical portions of pre-processing together in common pre-processing advantageously reduces the time for which the server SAC operates and thus makes it available for other tasks.

In another example, determined message formatting is common to all of the messages MD in which the length of the data field is identical and in which the security characteristics inserted into the header and required for that formatting satisfy predetermined conditions.

In yet another example, when the campaign aims to change a portion of contents in the cards, the database BD prepares data to be transmitted for cards targeted by the campaign in an operation that is identical for all of the cards that present the same subscription profile; this pre-processing is executed only once per profile for all of the cards having common profile characteristics so as to re-use the result obtained with the first card for the following cards.

The transmit/receive phase P2 is executed by the module M2 via a communications interface IC included in the server SAC, throughout the time range imposed by the operator managing the short message server SC. In FIG. 3, the transmit/receive block T/R extends from the beginning of transmission of a message of formatted data IP (MD) by the server SAC until the end of reception in the server SAC of an acknowledgement transmitted by the smart card Cn in response to the message IP (MD).

Under the control of the manager GE, the transmit/receive module M2 transmits the messages IP(MD) prepared during the preceding pre-processing phase P1 to the short message server SC, by starting by transmitting the first messages relating to the first cards, and then by giving priority to transmitting the messages relating to the cards for which the acknowledgement messages AC relating to previously transmitted data messages have been received by the module M2. For example, as shown in FIG. 3, the first messages relating to the cards C1 to C(n+1) are transmitted, then a second message relating to the second card C2 is transmitted after receiving the first acknowledgement message relating to the card C2.

The transmit/receive phase P2 can be finished when an acknowledgement message AC corresponding to the last data message MD prepared during the phase P1 is received, or naturally when the time allocated by the operator for the phase P2 expires. As indicated in FIG. 3, said last message can relate to any targeted card Cd of the campaign. In practice, the time that elapses between the beginning of transmission E of a data message MD and the end of reception R of an acknowledgement message AC, which time is illustrated by the length of a T/R block in FIG. 3, varies as a function of the availabilities of the networks RP and RR and of the server SC through which the messages pass, and, above all, as a function of the state of the mobile terminal containing the smart card that is the destination of the data message. The mobile terminal can be on standby, or busy, or switched off, or outside the network coverage. The length of a T/R phase element is, in practice, limited to a few tens of minutes, and the module M2 reiterates transmission of a data message MD for which it has not received an acknowledgement AC a plurality of times, e.g. two or three times. Each time that the module M2 has not received an acknowledgement message in reply to a data message, the module M2 re-transmits the data messages whose destination is the card in question starting from the first message. After a plurality of attempts that are spaced apart in time to various extents have been made to transmit a data message to a card Cn and have failed, the module M2 permanently abandons transmission of the data messages MD for the card Cn in question.

The packets IP(AC) transmitted by the short message server SC are unpacketed into acknowledgement messages that are optionally encrypted AC by the communications interface IC. The optionally encrypted acknowledgement messages AC are stored as they are received in a buffer memory of the server SAC, pending post-processing P3 by the module M3. Each acknowledgement message AC has a format similar to the format shown in FIG. 4 and is made up of a header ES that is specific to the associated card and that relates to security and synchronization, and of a data field CHD.

Once the last acknowledgement message AC is received, or, at the latest, on expiry of the time range allocated to the server SAC, the transmit/receive phase P2 is considered to be finished and is followed by the post-processing phase P3.

During the post-processing phase P3, the post-processing module M3 reads from the buffer memory and analyzes the optionally decrypted acknowledgement messages AC that were delivered by the smart cards C1 to CN through the mobile terminals T1 to TN and through the short message server SC in response to respective ones of the formatted data messages MD. For example, an acknowledgement message AC acknowledges downloading of data or of instructions from an application into the associated card, or acknowledges execution of a command that has succeeded or that has failed in the associated card.

The module M3 updates and analyzes the synchronization words (Sync) and the "images" of the contents of the cards C1 to CN in the tables TC1 to TCN of the database BD, in response to the acknowledgement messages relating to the cards. The contents of the card Cn in the table TCn are updated by the module M3 when all of the data messages concerning said updating have been acknowledged by messages AC so that the contents of the table TCn reflect the contents of the card Cn and are thus the image of said contents of the card.

In a manner similar to the manner of the pre-processing phase P1, the module M3 executes data post-processing POST relating to batches of cards, each batch of cards resulting from prior sorting of the cards, and relating to cards having one or more common characteristics. Therefore, the post-processing module M3 executes once only a common portion of data pre-processing relating to smart cards that have at least one common characteristic. For example, all of the cards that have a portion of their subscription profiles in common have a portion of their contents that is updated in their respective tables TC1 to TCN after a common preparation of the updating of the profile during the pre-processing phase P1.

Although the downloading method is described with reference to three phases P1, P2 and P3 that are completely separate as shown in FIG. 3, pre-processing and post-processing phases can be mixed. For example when a plurality of ranges of hours are provided for a campaign, the card administration server SAC executes the post-processing phase P3 relating to analyzing the acknowledgement messages AC received during the immediately preceding phase P1 so as to format data to be transmitted during a following transmit/receive phase P2.

The invention is not limited to downloading data into smart cards of the UICC type. A smart card into which data is to be downloaded can also be a card included in a laptop computer connected to a mobile terminal, or a credit card, or any other additional card included in a mobile terminal. In other variants, the invention applies to other portable communicating electronic objects, such as communicating Personal Digital Assistants (PDAs). The invention applies even to mobile terminals targeted by a campaign for which the data to be downloaded can concern a game to be recorded in the non volatile memories of the Electrically Erasable Programmable Read-Only Memory (EEPROM) type of the mobile terminals.

The invention claimed is:

1. A method for downloading data from a server into a plurality of portable communicating objects through a radiocommunications network, the downloading of data comprising the steps of:
   pre-processing data for each of a plurality of individual messages, in the server during a pre-processing phase in which the server is not in communication with the radiocommunications network, said data being pre-processed into a plurality of individual data messages destined for respective designated communicating objects;
   subsequent to the pre-processing of the data for all of the plurality of individual messages during the pre-processing phase, transmitting the plurality of individual data messages during a communication phase, from the server to the respective designated portable communicating objects;
   receiving, during the communication phase, by the server, acknowledgments transmitted by the respective communicating objects; and
   subsequent to the transmission of all of the plurality of individual messages and receipt of acknowledgements during the communication phase, post-processing data, in the server during a post-processing phase, said the post-processing of data being dependent upon the acknowledgments received from respective designated communicating objects, wherein said server is not in communication with said radiocommunications network during said post-processing phase.

2. A method according to claim 1, wherein the data pre-processing relating to the respective communicating objects that have at least one common characteristic has a common portion executed once only before the transmitting of data messages and the receiving of acknowledgements.

3. A method according to claim 1, wherein the data post-processing relating to the respective designated communicating objects that have at least one common characteristic has a common portion executed once only after the transmitting of data messages and the receiving of acknowledgements.

4. A method according to claim 1, wherein the data pre-processing relating to the respective designated communicating objects also includes:
   reading security parameters specific to the respective communicating objects from a database associated with the server; and
   generating, for each data message, a data message header including the security parameters that have been read, fragmenting the data to be downloaded into data fields and concatenating each data field with the generated header into a respective data message to be transmitted.

5. A method according to claim 1, wherein the data post-processing relating to the respective designated communicating objects also includes:
   analyzing acknowledgements delivered by the respective communicating objects;
   updating, for each of the respective communicating objects, a synchronization count as a function of the number of acknowledgements analyzed; and
   updating, for each of the respective communicating objects, an image of the contents of the respective communicating object in a data base associated with the server.

6. A method according to claim 1, wherein the data messages and the acknowledgements are respectively transmitted and received by the server through a communications gateway during the communication period, as one predetermined time range and with a maximum rate dependent on an operation of the communications gateway.

7. A download server for downloading data into a plurality of portable communicating objects of mobile terminals through a radiocommunications network, comprising:
   a pre-processing module for pre-processing data for all of a plurality of individual data messages destined for designated respective ones of the plurality of communicating objects during a pre-processing phase while the server is not communicating with the radiocommunications network;
   a buffer memory device for storing the plurality of individual data messages during the pre-processing phase prior to transmission;
   a transmit-receive module for transmitting the all of the individual data messages to respective ones of the designated communicating objects and for receiving acknowledgements transmitted by the designated communicating objects through the radiocommunications network during a communication period in response to the data messages, and
   a post-processing module for post-processing data in the server for individual messages transmitted to portable communicating objects from which acknowledgements were received, during a post-processing phase while the server is not communicating with the radiocommunications network.

8. A server according to claim 7, wherein the communicating objects are removable user smart cards of mobile terminals.

9. A server according to claim 7, wherein the communicating objects are mobile terminals.

10. A non-transitory computer-readable medium storing a computer program executable on a computer, said computer program including program instructions adapted to implementing a method for downloading data from a server into a plurality of portable communicating objects through a radio communications network when said program is loaded and executed in the server, said program including:
pre-processing instructions for pre-processing data for each of a plurality of individual data messages destined for respective ones of the plurality of portable communicating objects during a pre-processing phase while the server is not communicating with the radiocommunications network;
transmit-receive instructions for transmitting all of the individual data messages to respective communicating objects of the plurality of communicating objects, subsequent to the pre-processing of data for all of the plurality of individual messages, and for receiving acknowledgements transmitted by the communicating objects through the radiocommunications network during a communication period in response to the data messages; and
post-processing instructions for, subsequent to the transmission of all of the plurality of individual messages and receipt of acknowledgements during the communication phase, post-processing data in the server for communicating objects from which acknowledgements were received, during a post-processing phase while the server is not communicating with the radiocommunications network.

* * * * *